(12) United States Patent
Kawano

(10) Patent No.: US 10,830,222 B2
(45) Date of Patent: Nov. 10, 2020

(54) REFRIGERATION COMPRESSOR HAVING AN OUTER-ROTOR TYPE MOTOR WITH THE STATOR FIXED TO A MEMBER FIXED TO A CYLINDER BLOCK

(71) Applicant: PANASONIC APPLIANCES REFRIGERATION DEVICES SINGAPORE, Singapore (SG)

(72) Inventor: Hiroyuki Kawano, Shiga (JP)

(73) Assignee: PANASONIC APPLIANCES REFRIGERATION DEVICES SINGAPORE, Singapore (SG)

( * ) Notice: Subject to any disclaimer, the term of this patent is extended or adjusted under 35 U.S.C. 154(b) by 133 days.

(21) Appl. No.: 15/503,306

(22) PCT Filed: Aug. 4, 2016

(86) PCT No.: PCT/JP2016/003598
§ 371 (c)(1),
(2) Date: Feb. 10, 2017

(87) PCT Pub. No.: WO2017/033413
PCT Pub. Date: Mar. 2, 2017

(65) Prior Publication Data
US 2018/0216609 A1      Aug. 2, 2018

(30) Foreign Application Priority Data
Aug. 25, 2015   (JP) .................... 2015-165789

(51) Int. Cl.
*F04B 35/04*      (2006.01)
*F04B 39/00*      (2006.01)
(Continued)

(52) U.S. Cl.
CPC .............. *F04B 35/04* (2013.01); *F04B 35/01* (2013.01); *F04B 39/00* (2013.01);
(Continued)

(58) Field of Classification Search
CPC .......... F04B 35/01; F04B 39/00; F04B 9/025; F04B 9/045; F04B 23/021; F04B 39/0044;
(Continued)

(56) References Cited

U.S. PATENT DOCUMENTS

| 2,349,845 A | * | 5/1944 | Cody | .................... | F04B 39/127 |
| | | | | | 248/638 |
| 5,137,437 A | * | 8/1992 | Machida | ................. | F01C 21/02 |
| | | | | | 418/55.1 |

(Continued)

FOREIGN PATENT DOCUMENTS

| CN | 101482119 A | 7/2009 | | |
| CN | 203962324 | * 11/2014 | .............. | F04B 35/04 |

(Continued)

OTHER PUBLICATIONS

MachinetranslationJP2001263247, Patent Translate Espacenet.com, Nov. 12, 2019. (Year: 2019).*

(Continued)

*Primary Examiner* — Bryan M Lettman
*Assistant Examiner* — Timothy P Solak
(74) *Attorney, Agent, or Firm* — Hamre, Schumann, Mueller & Larson, P.C.

(57) ABSTRACT

A stator of an outer-rotor type motor is fixed to a stator fixing member, and the stator fixing member is fixed to a member (cylinder block) of a compression element, which has a main bearing. Further, an auxiliary bearing is configured to be separate from the stator fixing member and is fixed to the stator fixing member. In this manner, it is possible to fix the stator fixing member to the member of the compression element in a state in which an even clearance is formed between an inner circumference of a rotor and an outer circumference of the stator, and it is possible to fix the (Continued)

auxiliary bearing to the stator fixing member in a state in which the auxiliary bearing is reliably coaxial to the main bearing.

9 Claims, 3 Drawing Sheets

(51) Int. Cl.
| | |
|---|---|
| *H02K 1/27* | (2006.01) |
| *F04B 41/02* | (2006.01) |
| *F04B 53/22* | (2006.01) |
| *F04B 39/12* | (2006.01) |
| *F04B 53/16* | (2006.01) |
| *H02K 11/33* | (2016.01) |
| *F04B 35/01* | (2006.01) |
| *F25B 1/02* | (2006.01) |
| *H02K 1/18* | (2006.01) |

(52) U.S. Cl.
CPC ........ *F04B 39/0044* (2013.01); *F04B 39/122* (2013.01); *F04B 39/127* (2013.01); *F04B 41/02* (2013.01); *F04B 53/16* (2013.01); *F04B 53/22* (2013.01); *F25B 1/02* (2013.01); *H02K 1/187* (2013.01); *H02K 1/2786* (2013.01); *H02K 11/33* (2016.01)

(58) Field of Classification Search
CPC .. F04B 39/023; F04B 39/0276; F04B 39/122; F04B 39/127; F04B 53/22; F04B 9/046; F25B 1/02
See application file for complete search history.

(56) References Cited

U.S. PATENT DOCUMENTS

| | | | | | |
|---|---|---|---|---|---|
| 5,304,045 | A | * | 4/1994 | Hoshino | F04C 23/008 417/372 |
| 6,170,275 | B1 | * | 1/2001 | Ueno | F04D 29/541 416/174 |
| 2001/0048285 | A1 | * | 12/2001 | Furukawa | F04B 35/04 318/783 |
| 2003/0098624 | A1 | * | 5/2003 | Iwasa | F04B 35/002 310/112 |
| 2008/0112822 | A1 | * | 5/2008 | Ishida | F04B 39/0005 417/372 |
| 2010/0246083 | A1 | * | 9/2010 | Shibuya | B60H 1/3225 361/93.8 |
| 2011/0142694 | A1 | * | 6/2011 | Fagotti | F04B 39/066 417/410.1 |
| 2013/0052056 | A1 | * | 2/2013 | Kim | F04B 35/04 417/410.1 |
| 2013/0064697 | A1 | * | 3/2013 | Fukasaku | H02K 3/38 417/410.1 |
| 2013/0156617 | A1 | | 6/2013 | Bellet et al. | |
| 2014/0341763 | A1 | | 11/2014 | Kobayashi et al. | |
| 2015/0345485 | A1 | | 12/2015 | Kinjo et al. | |

FOREIGN PATENT DOCUMENTS

| | | | | |
|---|---|---|---|---|
| CN | 203962324 U | | 11/2014 | |
| CN | 104379931 A | | 2/2015 | |
| JP | 2001-263247 | | 9/2001 | |
| JP | 2001263247 | * | 9/2001 | .............. F04B 35/00 |
| JP | 2006-170005 | | 6/2006 | |
| JP | 2013-024064 | | 2/2013 | |

OTHER PUBLICATIONS

English Translation of Chinese Search Report dated Sep. 13, 2017 for the related Chinese Patent Application No. 201680002275.6, 2 pages.

The Extended European Search Report dated Oct. 20, 2017 for the related European Patent Application No. 16831700.6, 7 pages.

* cited by examiner

PRIOR ART

US 10,830,222 B2

REFRIGERATION COMPRESSOR HAVING AN OUTER-ROTOR TYPE MOTOR WITH THE STATOR FIXED TO A MEMBER FIXED TO A CYLINDER BLOCK

TECHNICAL FIELD

The present invention relates to a closed compressor using an outer rotor motor as an electric motor, and a refrigeration device equipped with the closed compressor.

BACKGROUND ART

Citation List

Patent Literature

PTL 1: Japanese Patent Unexamined Publication No. 2006-170005

In the related art, a type of closed compressor includes a closed compressor in which a rotor is fixed to a crankshaft on an upper side of a stator, an auxiliary bearing that pivotally supports the crankshaft is provided below an electric motor, and the stator is fixed to the auxiliary bearing (for example, see PTL 1).

The closed compressor of the related art disclosed in PTL 1 is described.

FIG. 3 illustrates a longitudinal-sectional view of the closed compressor of the related art disclosed in PTL 1.

In FIG. 3, the closed compressor includes compressing mechanism 2 that is accommodated in an upper portion of closed vessel 1 and compresses refrigerant gas, and electric motor 3 provided below the compressing mechanism 2, in which compressing mechanism 2 has crankshaft 4 that transmits rotation of electric motor 3 to compressing mechanism 2.

Crankshaft 4 described above has an upper portion that is pivotally supported by main bearing 6 provided in main frame 5 of compressing mechanism 2, and a lower portion that is pivotally supported by auxiliary bearing 7 fixed to a lower portion of closed vessel 1.

Compressing mechanism 2 configures a scroll-type compressing mechanism and is fixed to closed vessel 1 with fixed scroll 8 press-fitted into closed vessel 1.

Electric motor 3 is an outer-rotor type motor and is configured to include stator 9 and rotor 10 provided to have a predetermined clearance from outer circumferential surface 9a of stator 9.

Stator 9 is fixed to closed vessel 1 by being fastened, with bolt 11, to auxiliary bearing 7 fixed to closed vessel 1.

In addition, rotor 10 is fixed to crankshaft 4 via bowl-shaped rotor housing 10a on an upper portion of stator 9.

SUMMARY OF THE INVENTION

In such a configuration of the related art described above, in order to assemble main bearing 6 and auxiliary bearing 7 with accurate coaxiality and to prevent crankshaft 4 from twisting, it is necessary to secure high accuracy in the coaxiality between inner circumference 1a of closed vessel 1, outer circumference 8a of fixed scroll 8, outer circumference 7a and inner circumference 7b of fixed portion 9b of auxiliary bearing 7 that fixes stator 9, and inner circumference 10b of rotor 10 and inner circumference 10c of rotor housing 10a. Moreover, it is necessary to manufacture the component members with accuracy, and it is also necessary to assemble fixed scroll 8 and main bearing 6 with accuracy.

In addition, since the clearance between inner circumference 10b of rotor 10 and outer circumference 9a of stator 9 is determined by the assembly described above, the component members need to be manufactured with high accuracy as described above in order to form the even clearance.

In order to achieve high accuracy of the component members, it is necessary to perform processes with high accuracy, and thus costs of the processes increase.

On the other hand, the coaxiality between main bearing 6 and auxiliary bearing 7 is degraded with low accuracy, thus, crankshaft 4 twists, and uneven clearances are formed between inner circumference 10b of rotor 10 and outer circumference 9a of stator 9. In order to avoid contact of inner circumference 10b of rotor 10 with outer circumference 9a of stator 9, it is necessary to widen the clearance, and thus, a problem arises in that efficiency of the motor is reduced.

The invention provides a closed compressor that is able to reduce an occurrence of twist of crankshaft without processing the component members with high accuracy, and that is able to narrow the clearance between the inner circumference of the rotor and the outer circumference of the stator, thereby achieving high efficiency and reliability at low costs.

The closed compressor in the invention has a configuration in which a stator is fixed to a stator fixing member, the stator fixing member is fixed to a member of a compression element, which has a main bearing, and an auxiliary bearing is configured to be a member separate from the stator fixing member and is fixed to a stator fixing member.

In this manner, since it is possible to fix the stator fixing member to the member of the compression element in a state in which the even clearance is formed between the inner circumference of the rotor and the outer circumference of the stator, and it is possible to fix the auxiliary bearing to the stator fixing member in a state in which the auxiliary bearing is reliably coaxial to the main bearing, it is possible to narrow the clearance between the inner circumference of the rotor and the outer circumference of the stator, and it is possible to achieve high efficiency of motor. Further, since it is possible for the auxiliary bearing and the main bearing to be reliably coaxial to each other even when the component members are processed with low accuracy, it is possible to reduce costs in processing, to reduce a loss in bearing, and to secure reliability thereof.

DESCRIPTION OF EMBODIMENTS

Hereinafter, exemplary embodiments of the invention will be described with reference to the accompanying figures. Note that the invention is not limited to the exemplary embodiments.

First Exemplary Embodiment

Figure 1:
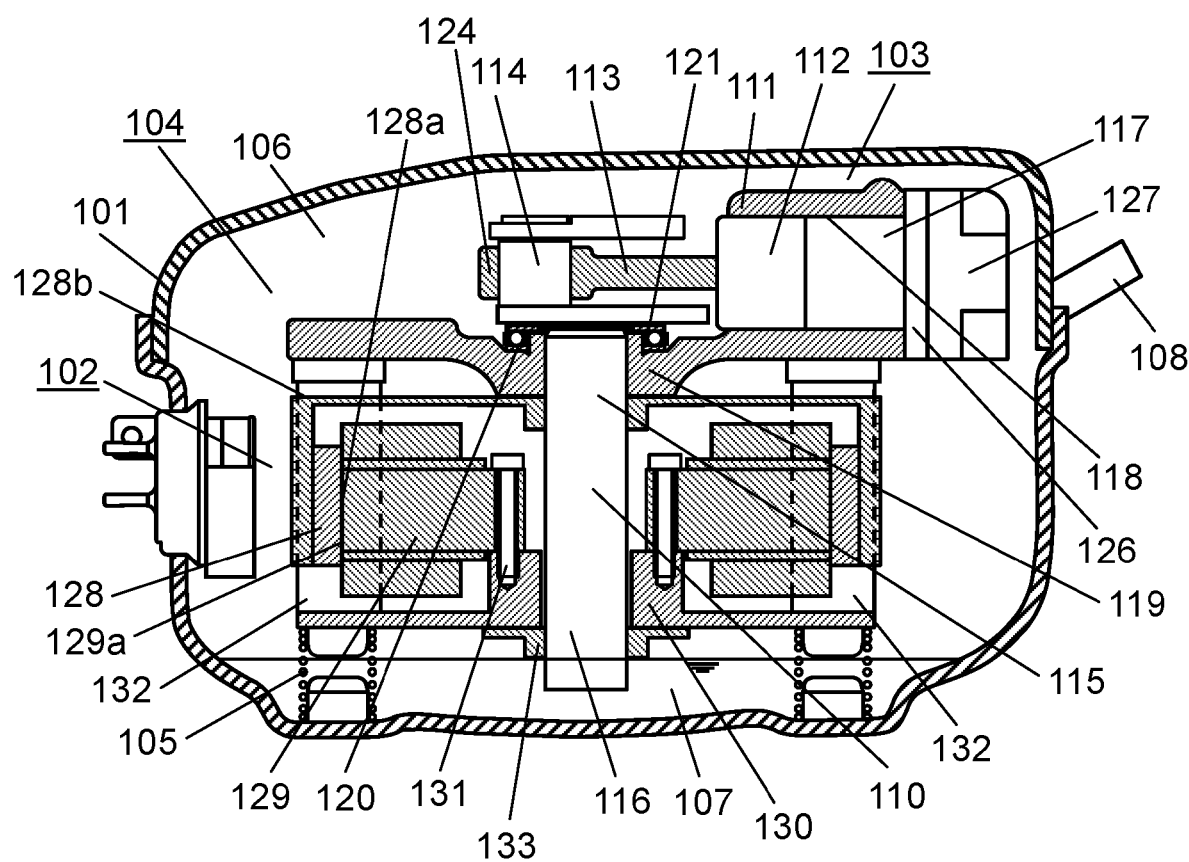
FIG. 1 is a longitudinal-sectional view of a closed compressor according to a first exemplary embodiment of the invention.

FIG. 1 is a longitudinal-sectional view of a closed compressor according to a first exemplary embodiment of the invention.

In FIG. 1, a closed compressor according to the exemplary embodiment has closed vessel 101 formed through drawing of an iron plate, and electric element 102 and compressor body 104 having, as a main body, compression element 103, which is driven by electric element 102, are disposed inside the closed vessel. Compressor body 104 is elastically supported by suspension spring 105.

Further, refrigerant gas 106 such as hydrocarbon-based R600a having a low global warming potential, for example, is sealed in closed vessel 101 in a state in which the refrigerant gas has a relatively low temperature at the same pressure as on a low-pressure side of a refrigeration device (not illustrated), and lubricant 107 for lubrication is sealed in a bottom portion in closed vessel 101.

In addition, closed vessel 101 is provided with suction pipe 108 having one end that communicates with a space inside closed vessel 101 and the other end that is connected to the refrigeration device (not illustrated), and a discharge pipe (not illustrated) that guides, to the refrigeration device (not illustrated), refrigerant gas 106 compressed in compression element 103.

Compression element 103 is configured to include crankshaft 110, cylinder block 111, piston 112, conrod 113, or the like.

Crankshaft 110 has eccentric shaft 114, main shaft 115, and auxiliary shaft 116 under main shaft 115.

Cylinder block 111 is integrally provided with cylinder bore 118 that forms compression chamber 117, and is also provided with main bearing 119 that pivotally supports main shaft 115 such that the main shaft freely rotates, and thrust ball bearing 121 that supports a load of crankshaft 110 in a vertical direction on thrust surface 120.

Piston 112 reciprocates in cylinder bore 118, and a piston pin (not illustrated) is disposed to have an axial core that is parallel to an axial core of eccentric shaft 114.

Conrod 113 has large end hole 124 and a small end hole (not illustrated), eccentric shaft 114 is fitted into large end hole 124, and the piston pin is fitted into the small end hole. In this manner, eccentric shaft 114 is connected to piston 112.

In addition, valve plate 126 provided with a suction hole (not illustrated) and a discharge hole (not illustrated), a suction valve (not illustrated) that opens and closes the suction hole (not illustrated), and cylinder head 127 that blocks valve plate 126 are fixed by being jointly fastened by a head bolt (not illustrated) in an end plane of an opening of cylinder bore 118 on a side opposite to crankshaft 110.

Cylinder head 127 is provided in a discharge space to which refrigerant gas 106 is discharged, and the discharge space directly communicates with a discharge pipe (not illustrated) via discharge piping (not illustrated).

Electric element 102 is an outer-rotor type motor configured to include rotor 128 fixed to the main shaft 115 side of crankshaft 110 via rotor housing 128b, and stator 129 disposed on an inner side of rotor 128. Stator 129 is fixed to stator fixing member 130 with screw 131, and stator fixing member 130 is fixed to leg 132 extending downward from cylinder block 111. Auxiliary bearing 133, which pivotally supports auxiliary shaft 116 of crankshaft 110 such that the auxiliary shaft freely rotates, is fixed to stator fixing member 130.

Hereinafter, operations and effects of the closed compressor having such a configuration described above will be described.

The closed compressor configures a refrigeration cycle, with suction pipe 108 and the discharge pipe (not illustrated) connected to a refrigeration device (not illustrated) having a known configuration.

In such a configuration, when electric element 102 is energized, a current flows to stator 129, a magnetic field is generated, and rotor 128 fixed to the main shaft 115 side of crankshaft 110 rotates. Crankshaft 110 rotates in response to the rotation thereof, and piston 112 reciprocates in cylinder bore 118 via conrod 113 that is attached to eccentric shaft 114 such that the conrod freely rotates.

Suction, compression, and discharge of refrigerant gas 106 are performed in compression chamber 117 in response to the reciprocation of piston 112.

In addition, since rotor 128 as a rotating member is positioned above a lower end of stator 129, and is far from an oil level of lubricant 107, it is possible to prevent lubricant 107 from being stirred such that it is possible to reduce a stirring loss.

Next, an assembling method of electric element 102 to compression element 103 will be described.

Rotor 128 is fixed through shrink-fitting to main shaft 115 side of crankshaft 110, and stator 129 is fixed to stator fixing member 130 with screw 131.

Here, since an occurrence of distortion is reduced through the assembling in the fixing performed with screw 131, compared to press-fitting, shrink-fitting, or welding, it is possible to improve the assembling accuracy. In addition, it is possible to perform the assembling with simple equipment such that it is possible to reduce manufacturing costs.

Stator 129 fixed to stator fixing member 130 in a manner described above is installed in the inner side of rotor 128. After positioning is performed with a jig such that an even clearance is formed between inner circumference 128a of rotor 128 and outer circumference 129a of stator 129, stator fixing member 130 is fixed to leg 132 extending downward from cylinder block 111. In this manner, it is possible to obtain coaxiality between inner circumference 128a of rotor 128 and outer circumference 129a of stator 129 with accuracy. Therefore, it is possible to narrow the clearance between inner circumference 128a of rotor 128 and outer circumference 129a of stator 129 such that it is possible to achieve high efficiency of the motor.

Next, assembling method of auxiliary bearing 133 to stator fixing member 130 will be described.

Auxiliary bearing 133 is temporarily joined to stator fixing member 130, crankshaft 110 is rotated and the rotational torque is measured while the position of auxiliary bearing 133 is changed. When crankshaft 110 is twisted, the rotational torque increases. Therefore, auxiliary bearing 133 is fixed to stator fixing member 130 at a position at which the minimum rotational torque is produced. In this manner, since it is possible to perform the assembling in a state in which crankshaft 110 has the minimum twist, it is possible to reduce a sliding loss such that it is possible to enhance reliability.

Further, when auxiliary bearing 133 is a spherical bearing, it is possible to reduce an occurrence of the twist of crankshaft 110 without positioning auxiliary bearing 133 unlike the above description such that it is possible to improve productivity.

In addition, in a case where the closed compressor of the exemplary embodiment is caused to be driven using an inverter and to rotate at a low speed, an effect of inertia of rotor 128 increases, compared to an inner-rotor motor in which rotor 128 is disposed on the inner side, and thus it is possible to improve efficiency in that torque variation is reduced and there is no need to provide complicated control.

Second Exemplary Embodiment

Figure 2:
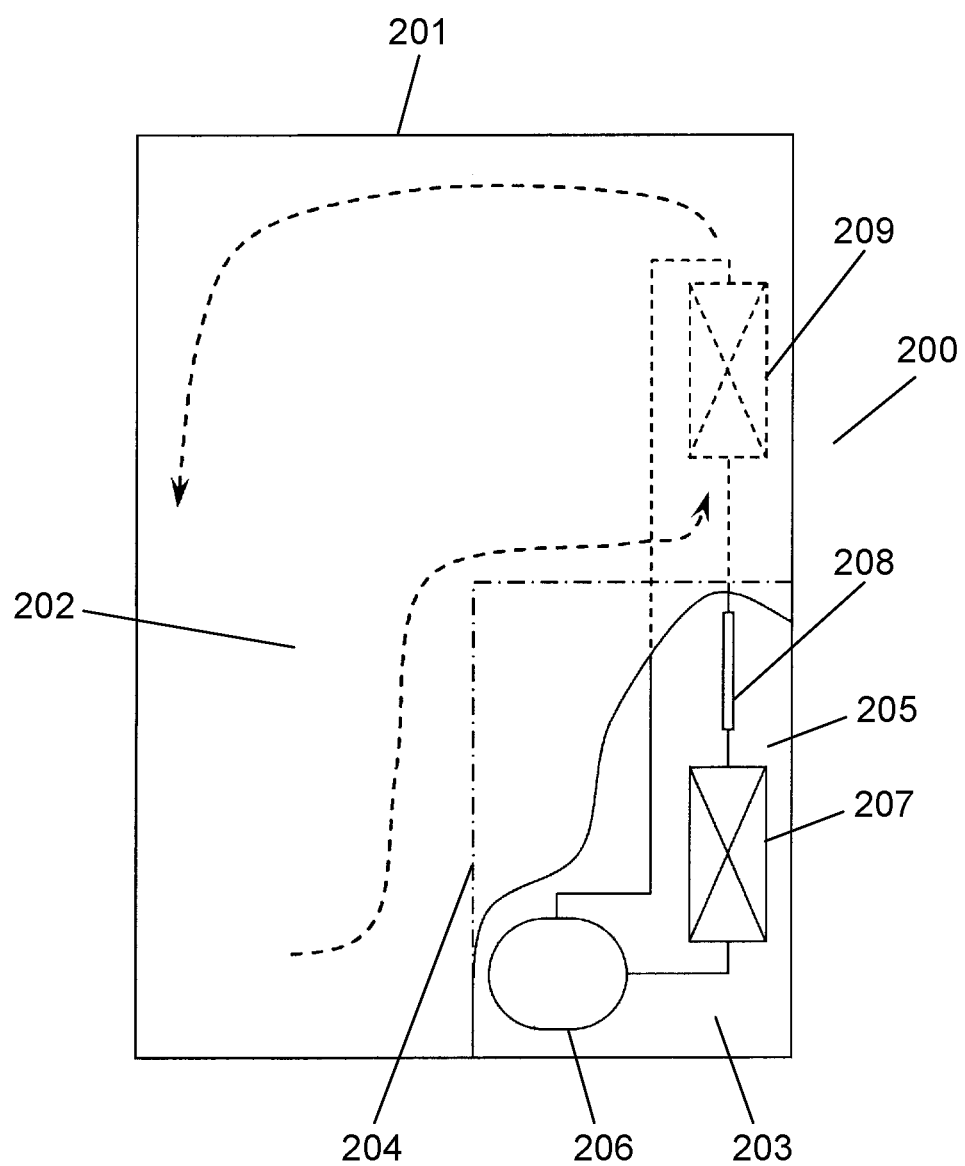
FIG. 2 is a schematic diagram illustrating a configuration of a refrigeration device according to a second exemplary embodiment of the invention.
Figure 3:
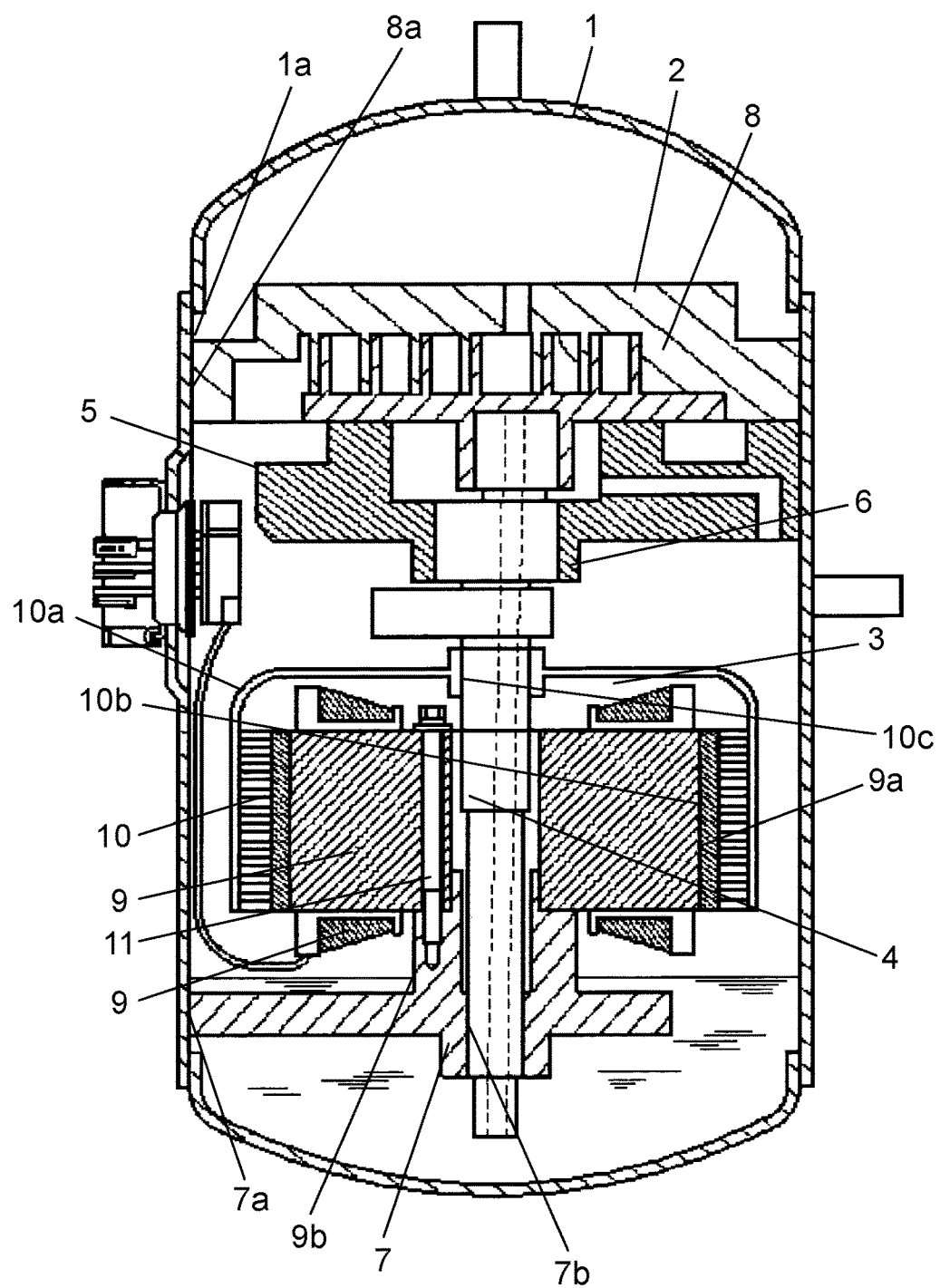
FIG. 3 is a longitudinal-sectional view of a closed compressor of the related art.

FIG. 2 illustrates a refrigeration device according to a second exemplary embodiment of the invention, and a configuration in which the closed compressor described in the first exemplary embodiment is equipped on a refrigerant circuit is adopted. Here, a basic configuration of the refrigeration device is schematically described.

In FIG. 2, refrigeration device 200 includes main body 201 configured to include a box member that has one open side and has thermal insulation properties, and a door body which opens and closes the opening, partition wall 204 that partitions the inside of main body 201 into storage space 202 of goods and mechanical chamber 203, and refrigerant circuit 205 that cools the inside of storage space 202.

Refrigerant circuit 205 is configured of ring-shaped piping connection with closed compressor 206, radiator 207, decompressor 208, and heat sink 209.

Closed compressor 206 is the closed compressor described in the first exemplary embodiment.

In addition, heat sink 209 is disposed in storage space 202 provided with a blower (not illustrated). As illustrated with a dashed-line arrow, cooling heat of heat sink 209 is stirred by the blower so as to circulate inside storage space 202.

The refrigeration device described above is equipped with closed compressor 206 described in the first exemplary embodiment. In this manner, evenness of the clearance between the inner circumference of the rotor and the outer circumference of the stator and the coaxiality between the main bearing and the auxiliary bearing are secured, and thereby efficiency of the motor is improved, or an effect of reduction in the sliding loss is achieved such that it is possible to operate the refrigerant circuit with the closed compressor that has the improved efficiency. Therefore, it is possible to reduce power consumption of the refrigeration device such that it is possible to realize energy conservation.

As described above, according to the invention, a closed vessel accommodates the electric element and the compression element that is driven by the electric element. In addition, the compression element includes the crankshaft that is configured to have the main shaft, the eccentric shaft, and the auxiliary shaft provided under the main shaft, the cylinder block having the cylinder bore provided to have a penetrating circular cylinder shape, the piston that reciprocates in the cylinder bore, and the conrod that connects the piston and the eccentric shaft. Further, the compression element includes the main bearing that is formed in the cylinder block and that pivotally supports a load in a radial direction, which acts on the main shaft of the crankshaft, and the auxiliary bearing that pivotally supports a load in a radial direction, which acts on the auxiliary shaft of the crankshaft. The electric element is the outer-rotor type motor that is configured to have a rotor fixed to the crankshaft on the main shaft side and a stator disposed on an inner side of the rotor, in which the stator is fixed to the stator fixing member disposed on the auxiliary shaft side, the stator fixing member is fixed to the compression element, and the auxiliary bearing is fixed to the stator fixing member.

In this manner, it is possible to fix the stator fixing member to the compression element in a state in which the even clearance is formed between the inner circumference of the rotor and the outer circumference of the stator, with a jig or the like, and further it is possible to fix the auxiliary bearing to the stator fixing member in a state in which the auxiliary bearing is reliably coaxial to the main bearing. Therefore, since it is possible to secure evenness of the clearance between the inner circumference of the rotor and the outer circumference of the stator and the coaxiality between the main bearing and the auxiliary bearing without using highly accurate component members, it is possible to improve efficiency and reliability of the closed compressor without an increase in costs.

In addition, according to the invention, the stator may be configured to be fixed to the stator fixing member through screwing.

In this manner, since it is possible to more improve the assembling, compared to the case of fixing the stator through press-fitting, shrink-fitting, or welding, it is possible to reduce manufacturing costs of the closed compressor.

In addition, according to the invention, a spherical bearing may be used as the auxiliary bearing.

In this manner, since the twist of the shaft is canceled even in a case where the coaxiality between the main bearing and the auxiliary bearing is rather degraded, it is possible to easily perform the assembling such that it is possible to improve the assembling of the closed compressor.

In addition, according to the invention, the electric element may be configured to be driven at a plurality of operation frequencies using the inverter.

In this manner, even in slow rotation with high torque variation, the rotor is positioned on the outer side, thus a radius of rotation increases, and an effect of the inertia increases. Therefore, it is possible to improve efficiency in that torque variation is reduced and there is no need to depend on control.

In addition, according to the invention, the refrigeration device may include: the closed compressor described above; and the refrigerant circuit that connects the radiator, the decompressor, and the heat sink with piping in the ring shape.

In this manner, it is possible to reduce power consumption of the refrigeration device through the installation of the closed compressor having the improved efficiency such that it is possible to realize energy conservation, and it is possible to improve the reliability of the closed compressor. Therefore, it is possible to improve reliability of the refrigeration device.

INDUSTRIAL APPLICABILITY

As described above, since it is possible to improve efficiency of the closed compressor and the refrigeration device according to the invention, the invention is not limited to an electric refrigerator or an air conditioner for a household use, and can be widely applied to a refrigeration device in an industrial showcase, a vending machine, or the like.

REFERENCE MARKS IN THE DRAWINGS 101 closed vessel
102 electric element
103 compression element
110 crankshaft
111 cylinder block
112 piston
113 conrod
114 eccentric shaft
115 main shaft
116 auxiliary shaft
118 cylinder bore 119 main bearing
128 rotor
129 stator
130 stator fixing member
131 screw
133 auxiliary bearing
200 refrigeration device
205 refrigerant circuit
206 closed compressor
207 radiator
208 decompressor
209 heat sink

The invention claimed is:

1. A closed compressor comprising:
a closed vessel that accommodates an electric element and a compression element which is driven by the electric element,
wherein the compression element includes:
   a crankshaft having a main shaft section, an eccentric shaft section, and an auxiliary shaft section provided distal to the eccentric shaft section,
   a cylinder block having a cylinder bore penetrating the cylinder block, the cylinder bore having circular cylinder shape,
   a piston that reciprocates in the cylinder bore,
   a conrod that connects the piston and the eccentric shaft section,
   a main bearing that is formed in the cylinder block and that pivotally supports a load in a radial direction, which acts on the main shaft section of the crankshaft, and
   an auxiliary bearing that pivotally supports a load in a radial direction, which acts on the auxiliary shaft section of the crankshaft,
wherein the electric element is an outer-rotor type motor that is configured to have a rotor fixed to the crankshaft on a main shaft section side and a stator disposed on an inner side of the rotor,
wherein the stator is fixed to a stator fixing member disposed on an auxiliary shaft section side, the stator fixing member having a flat surface perpendicular to an axial direction of the crankshaft, and the auxiliary shaft section of the crankshaft extending through a cavity in the stator fixing member, such that a clearance is provided between the auxiliary shaft section of the crankshaft and the stator fixing member,
wherein the stator fixing member is fixed to the compression element, and
wherein the auxiliary bearing is a separate member from the stator fixing member and is fixed directly to the flat surface of the stator fixing member, in a position in which the auxiliary bearing is coaxial to the main bearing, wherein the flat surface of the stator fixing member extends beyond lateral edges of the auxiliary bearing.

2. The closed compressor of claim 1,
wherein the stator is fixed to the stator fixing member by a plurality of screws.

3. The closed compressor of claim 2,
wherein the auxiliary bearing is a spherical bearing.

4. The closed compressor of claim 3,
wherein the electric element is configured to be driven at a plurality of operation frequencies using an inverter.

5. The closed compressor of claim 2,
wherein the electric element is configured to be driven at a plurality of operation frequencies using an inverter.

6. The closed compressor of claim 1,
wherein the auxiliary bearing is a spherical bearing.

7. The closed compressor of claim 6,
wherein the electric element is configured to be driven at a plurality of operation frequencies using an inverter.

8. The closed compressor of claim 1,
wherein the electric element is configured to be driven at a plurality of operation frequencies using an inverter.

9. A refrigeration device comprising:
the closed compressor of claim 1; and
a refrigerant circuit that connects a radiator, a decompressor, and a heat sink with piping in a closed circuit.

* * * * *